(12) United States Patent
Davis et al.

(10) Patent No.: US 6,307,005 B1
(45) Date of Patent: Oct. 23, 2001

(54) ROBUST PROCESS FOR THE SYNTHESIS OF POLYESTERCARBONATES

(75) Inventors: Gary Charles Davis, Albany; David Paul Mobley, Niskayuna, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/429,669

(22) Filed: Oct. 29, 1999

(51) Int. Cl.⁷ .................................................. C08G 64/01
(52) U.S. Cl. ............................................. 528/196; 528/198
(58) Field of Search ..................................... 528/196, 198

(56) References Cited

U.S. PATENT DOCUMENTS

| | | | |
|---|---|---|---|
| 4,983,706 | 1/1991 | Fontana et al. | 528/176 |
| 5,025,081 | 6/1991 | Fontana et al. | 528/176 |
| 5,510,448 | 4/1996 | Fontana et al. | 528/196 |
| 5,807,965 | 9/1998 | Davis | 528/196 |
| 5,959,064 | 9/1999 | Krabbenhoft . | |

FOREIGN PATENT DOCUMENTS

| | | |
|---|---|---|
| 544497 | 6/1993 | (EP) . |
| 926176 | 6/1999 | (EP) . |

OTHER PUBLICATIONS

International Search Report for International Application No. PCT/US 00/26657.

*Primary Examiner*—Terressa M. Boykin
(74) *Attorney, Agent, or Firm*—S. Bruce Brown; Noreen C. Johnson

(57) ABSTRACT

The present invention related to a method for preparing a polyestercarbonate, the method comprising:

a) reacting a dihydric phenol and a diacid having from 12 to about 30 carbon atoms in the presence of an effective amount of carbonate precursor, thereby forming a reaction mixture, wherein the pH of the reaction mixture is maintained in an initial pH range of from about 8.5 to about 9.5 for about 50% to about 95% of the total carbonate precursor addition, and a second pH range of from about 10 to about 12 for the remainder of the carbonate precursor addition.

24 Claims, No Drawings

ROBUST PROCESS FOR THE SYNTHESIS OF POLYESTERCARBONATES

FIELD OF THE INVENTION

This invention relates to a process for preparing polyestercarbonates by the interfacial process, polyestercarbonates prepared by this process, and articles made from these polyestercarbonates.

BACKGROUND OF THE INVENTION

Polycarbonates are well known as tough, clear, highly impact resistant thermoplastic resins. Polycarbonates, however, possess relatively high melt viscosity. The polycarbonate of 4,4'-isopropylidenediphenol (BPA), for instance, is a well known engineering molding plastic.

In order to prepare a molded article from polycarbonate, relatively high extrusion and molding temperatures are required. In order to reduce the melt viscosity while also maintaining the desired physical properties, methods including the addition of plasticizers, the incorporation of aliphatic chainstoppers, the reduction of molecular weight, and the preparation of blends of polycarbonate with other polymers have been practiced. Known methods also include the addition of diacid residues into the polycarbonate to produce polyestercarbonate.

U.S. Pat. No. 5,510,448 discloses a copolyestercarbonate composition derived from a dihydric phenol, a carbonate precursor, and an aliphatic alpha omega dicarboxylic acid or ester precursor.

U.S. Pat. No. 5,025,081 discloses a process of preparing a coplyestercarbonate in which an aliphatic alpha omega diacid is incorporated into aromatic polycarbonate backbones. The process involved a method in which the pH is adjusted in a stepwise manner.

U.S. Pat. No. 4,983,706 discloses a process for preparing a polyestercarbonate which comprises reacting interfacially a dihydric phenol, a carbonate precursor, and the salt of an aliphatic alpha omega dicarboxylic acid having from 8 to about 20 carbon atoms.

Conventional industrial plants synthesize polycarbonate by mixing together an aqueous solution of dihydric compound (e.g., bisphenol-A) with an organic solvent (e.g., dichloromethane) containing a carbonyl halide (e.g., phosgene). Upon mixing the immiscible organic and aqueous phases, the dihydric compound reacts with the carbonyl halide at the phase interface. Typically, a phase transfer catalyst, such as a tertiary amine, is added to the aqueous phase to enhance this reaction. This synthesis method is commonly known as the "interfacial" synthesis method for preparing polycarbonate.

Typically, the preparation of polycarbonate, for example BPA polycarbonate, by the interfacial method is performed at a pH of from about 9 to about 11, more typically from about 9.5 to about 11. Performing the reaction at the higher pH has the advantages of better pH control, reduced build-up of phosgene in the reactor and no hydrolysis of carbonate salts to produce carbon dioxide and subsequent pressure build-up in the reactor. It would be very advantageous, therefore to be able to perform the interfacial polymerization reaction at the highest pH possible.

In order to obtain incorporation of the diacid into the polycarbonate to produce a polyestercarbonate, however, a pH profile is used. By "pH profile" it is meant that the reaction is conducted at different pHs for different periods of time during the reaction. Typically, the pH of the reaction mixture is maintained at about pH 8 to about 8.5 as long as the diacid is present in the reaction mixture. Then the pH of reaction mixture is raised to about pH 10 to about 11. If the pH is held higher than about 8.5 during the initial part of the reaction, not all of the diacid will be incorporated into the polyestercarbonate. If the pH is not raised to above about pH 10 during the latter period of the reaction, some of the diacid may be incorporated as a thermally unstable anhydride.

It would be desirable to develop a process whereby the pH of the interfacial process for the production of polyestercarbonates could be performed at higher pHs.

BRIEF SUMMARY OF THE INVENTION

In one aspect the invention relates to a method for preparing a polyestercarbonate, the method comprising:

a) reacting a dihydric phenol and a diacid having from 12 to 30 carbon atoms in the presence of an effective amount of carbonate precursor, thereby forming a reaction mixture, wherein the pH of the reaction mixture is maintained at from about 8.0 to about 9.5 for about 50 to about 95% of the total carbonate precursor addition, and from about 10 to about 12 for the remainder of the carbonate precursor addition.

The invention further relates to polyestercarbonates prepared by this method, and articles prepared from these polyestercarbonates.

DETAILED DESCRIPTION OF THE INVENTION

The present invention solves these problems, and provides further surprising properties. These and further objects of the invention will be more readily appreciated when considering the following disclosure and appended claims.

The present invention may be understood more readily by reference to the following detailed description of preferred embodiments of the invention and the examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In the specification and claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

The term "polyestercarbonate" includes polyesters and copolyestercarbonates.

The term "alkyl" as used herein refers to a branched or unbranched, saturated or unsaturated hydrocarbon group of 2 to 24 carbon atoms, with preferred groups within this class containing 2 to 8 carbon atoms.

"BPA" is herein defined as bisphenol A or 2,2-bis(4-hydroxyphenyl)propane. "SBI" is herein defined as 6,6'-dihydroxy-3,3,3',3'-tetramethylspirobiindane.

"CD-I" is herein defined as 6-hydroxy-1(4'-hydroxyphenyl)-1,3,3-trimethylindane.

"BPI" is herein defined as 1,1 bis-(4-hydroxyphenyl)-3,3,5-trimethylcyclohexane.

Unless otherwise stated, "mole %" in reference to the composition of a polyestercarbonate in this specification is based upon 100 mole % of residues of the total dihydric phenol (diol) units and dicarboxylic acid units of the polycarbonate.

As mentioned, the present invention relates to a process for preparing polyestercarbonates by the interfacial method. The reaction involves the reaction of a diacid and a diphenol in the presence of a carbonate precursor in a solvent.

It has been unexpectedly found that the processing window for the incorporation of diacids into polyestercarbonate becomes broader and is shifted to more favorable, i.e. higher, pHs as the methylene chainlength of the diacid chain increases above $C_{10}$ until the methylene chainlength reaches about $C_{30}$. Consequently, the interfacial reaction may be conducted at higher pHs with the incorporation of the diacids and little or no formation of anhydrides. As mentioned, this is highly desirable, as running at the higher pHs provides better pH control, little or no chance of phosgene build-up in the reactor, and no hydrolysis of carbonate salts to give carbon dioxide and subsequent pressure build-up in the reactor. In particular, it is desirable to run the initial period of the reaction at an initial pH range of from about 8.5 to about 9.5. At pHs above 9.5, the product polyestercarbonate was found to contain unacceptable levels of anhydride.

The term "anhydride", as used herein, means the diacid moiety of the polymer which has an anhydride linkage between it and a second acid moiety as illustrated below with dodecanedioc acid:

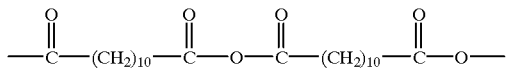

These anhydride bonds are formed during the interfacial phosgenation polymerization reaction at pH<9 by reaction of a diacid with phosgene followed by further reaction with a diacid. The polyestercarbonate of the invention preferably has less than about 0.5 mole percent anhydride bonds, preferably less than about 0.3 and more preferably less than about 0.1 mole percent anhydride bonds, based on the dihydric phenol plus dicarboxylic acid. The presence of these anhydride bonds in the copolyestercarbonate polymer are extremely injurious to the thermal stability of the copolyestercarbonate of this invention.

In the present invention, the dicarboxylic acid residues of the polyestercarbonate are preferably derived from an aliphatic alpha omega dicarboxylic acid of from about 12 to about 30 carbon atoms. The aliphatic system may be linear, branched or cyclic. The linear saturated aliphatic alpha omega dicarboxylic acids with methylene chain length greater than 14 are preferred. Linear saturated dicarboxylic acids, including the 12 carbon dicarboxylic acid, are available through chemical synthesis processes. Linear saturated dicarboxylic acids, including the 18 carbon dicarboxylic acid, can also be produced through biochemical conversion of linear alkanes of fatty acids.

Dihydric phenols which are useful in preparing the polyestercarbonate of the invention may be represented by the general formula

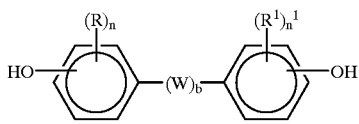

wherein:
R is independently selected from halogen, monovalent hydrocarbon, and monovalent hydrocarbonoxy radicals;
$R^1$ is independently selected from halogen, monovalent hydrocarbon, and monovalent hydrocarbonoxy radicals:
W is selected from divalent hydrocarbon radicals,

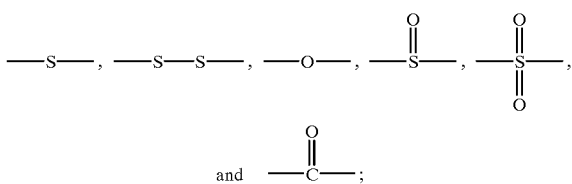

n and $n^1$ are independently selected from integers having a value of from 0 to 4 inclusive; and
b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals which may be substituted or unsubstituted. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula $—OR^2$ wherein $R^2$ is a monovalent hydrocarbon radical of he type described hereinafore. Preferred monovalent hydrocarbonoxy radicals are the alkoxy and aryloxy radicals.

Suitable dihydric phenols include, but are not limited to, BPA; 2,2-bis(3,5-dibromo-4-hydroxyphenyl)propane; 2,2-bis(3,5-dimethyl-4-hydroxyphenyl)propane; 1,1-bis(4-hydroxyphenyl)cyclohexane; 1,1-bis(3,5-dimethyl-4-hydroxyphenyl)cyclohexane; 1,1-bis(4-hydroxyphenyl)decane; 1,1-bis(4-hydroxyphenyl)propane; 1,1-bis(4-hydroxyphenyl)cyclodecane; 1,1-bis(3,5-dimethyl-4-hydroxyphenyl)cyclododecane; 4,4-dihydroxyphenyl ether; 4,4-thiodiphenol; 4,-4-dihydroxy-3,3-dichlorodiphenyl ether; 4,4-thiodiphenol; 4,4-dihydroxy-3,3-dichlorodiphenyl ether; 4,4-dihydroxy-2,5-dihydroxydiphenyl ether; BPI; 1,1-bis(4-hydroxyphenyl)-1-phenylethane; 1,1-bis(3-methyl-4-hydroxyphenyl)-1-phenylethane, and mixtures thereof. In one embodiment, the residues of dihydric phenol in the polyestercarbonate comprise 100 mole % of residues derived from BPA. SBI, CD-I and BPI may also be used as dihydric phenols.

In the present invention, it is preferable to perform the reaction of the dihydric phenol and the diacid in a first pH profile of from around about 7.5 to about 9.5, preferably about 8 to 9.5, even more preferably from about 8.5 to about 9.5, even more preferably from about 9 to about 9.5, for about 40 to about 95% of the carbonate precursor addition; more preferably from about 50 to about 85% of the carbonate precursor addition, followed by adjustment of the pH level to about 10 to 12, preferably from about 10 to about 11, for the remainder of the precursor addition. The time period before the pH is adjusted to a pH level of about 10 to about 12 is herein referred to as an "initial period". The diacid is present in the reaction system, during the first pH profile, or the initial period, at from about 0.1 to about 50, preferably from about 0.5 to about 20 mole %, even more preferably from about 0.5 to about 10 mole %.

The reaction to produce the polyestercarbonate interfacially requires an alkali metal base and/or an alkaline-earth metal base herein referred to as a caustic compound. The caustic compound is preferably introduced as an aqueous caustic solution comprising the caustic compound. The aqueous caustic solution preferably comprises potassium hydroxide, sodium hydroxide and mixtures thereof, even more preferably sodium hydroxide. The aqueous caustic solution preferably has a strength of about 10 to about 50 weight percent, preferably between about 15 to about 40 weight percent. The introduction of the caustic compound is used to control the pH of the reaction system.

Suitable carbonyl halides for use in the present process, include, but are not limited to carbonyl chloride, carbonyl bromide, carbonyl iodide, carbonyl fluoride and mixtures thereof. Dimers of phosgene and trimers of phosgene are also suitable carbonyl halides. Phosgene is the preferred carbonyl halide. The carbonyl halide may be introduced into the reaction system in the form of a gas or a liquid, or it may be dissolved in any feed stream except the caustic feed stream before the introduction of the feed stream into the reaction system.

In addition to the other reactants, amine catalysts, including, but not limited to triethylamine, may be employed in the interfacial reaction. The amine catalyst may be introduced within a range of about 0.75 to about 3.0 mole % based on the dihydric phenol content in the interfacial reaction. In addition, phase transfer catalysts may be used, such as tetralkylammonium salts, guanadinium salts and mixtures thereof; alone or in combination with amine catalysts.

The polyestercarbonates of the invention preferably have glass transition temperatures of at least about 100° C. Preferred glass transition temperatures are in the range of about 115° C. to about 180° C.; more preferably 125° C. to about 150° C.

The weight average molecular weight of the polyestercarbonate, as measured by GPC using a polystyrene standard, is from about 10,000 to about 70,000; preferably about 15,000 to about 65,000; even more preferably about 20,000 to about 55,000.

In addition to the components described, the polyestercarbonates may comprise residues of a chain terminating agent. Quantities of chain terminating agent vary from about 0.5 to about 7 mole %, based on the dihydric phenol. Suitable chain terminating agents include monofunctional hydroxyaromatic agents, such as phenols. Suitable phenols include, but are not limited to phenol, isoctylphenol; para-tertiary butyl phenol; isononyl phenol; paracumyl phenol; chromanyl compounds, such as chroman I, and mixtures thereof. The corresponding chloroformates of these compounds may also be used.

The residues of the diacid are present in the copolyestercarbonate in quantities of from about 0.1 to about 50 mol %. Generally with quantities below about 0.5 mole percent, the $T_g$ is insufficiently lowered and significantly altered polymer melt flow rate is not observed. Above about 30 mole percent, the physical properties of the copolyestercarbonate are significantly hindered in comparison to the polycarbonate without the aliphatic ester linkages. Preferable mole percents of diacid are from about 0.5 to about 20, even more preferably about 0.5 to about 10 mole percent.

The polyestercarbonate may be used to form a number of articles for a variety of uses. End-use applications include molded articles such as instrument panels for cars, sheet materials, food service containers; housings for telephones; housings for computer; optical articles such as eyeglasses, lenses, and face shields; and recording media such as compact disks.

The desired article may be obtained by molding the polycarbonate or polycarbonate blend by injection molding, compression molding, extrusion methods and solution casting methods. Injection molding is the more preferred method of forming the article.

If desired, the polyestercarbonates of the invention may be blended with other polymers. Suitable modifying polymers are those which form blends with the polycarbonates of the invention. Possible modifying polymers include polycarbonates, other polyestercarbonates; polyesters, polyamides, polystyrenes, polyurethanes, polyarylates, liquid crystalline polymers, vinyl polymers and the like, or mixtures thereof.

The polyestercarbonates of the present invention may also contain antioxidants, flame retardants, such as phosphorous or halogen compounds, fillers, such as talc or mica, or reinforcing agents such as glass fiber, KEVLAR, or carbon fiber. Additives, such as pigments, dyes, stabilizers, plasticizers may also be used in the polyestercarbonates and blends of the present invention to modify the properties of the product.

The following examples are intended to illustrate the present invention but are not intended to limit the scope thereof.

EXAMPLES

The following examples are set forth to provide those of ordinary skill in the art with a complete description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in °C.

Anhydride content was analyzed by 1-H NMR to determine the level of diacid incorporated as well as the ratio of ester groups to anhydride groups. Such NMR spectra may be acquired using a 6 kHz sweep width, a 10 second recycle delay, 30° flip angle, 16 k memory size and 32 transients on a GENERAL ELECTRIC NMR OMEGA-300 NMR Spectrometer.

TABLE I

| Diacid (DA) | pH | Mol % Incorp. | % Anhydride | DA in Brine (ppm) |
|---|---|---|---|---|
| C-10 | 7.5 | 9.99 | 0 | 100 |
| C-10 | 8.0 | 9.56 | trace | 500 |
| C-10 | 8.5 | 7.57 | 11.0 | >2000 |
| C-10 | 9.0 | 6.07 | 33.0 | >2000 |
| C-12 | 8.0 | 9.86 | 0 | <50 |
| C-12 | 8.5 | 9.85 | 0 | <50 |
| C-12 | 9.0 | 9.60 | 18.0 | 500 |
| C-16 | 8.0 | 9.94 | 0 | <50 |
| C-16 | 8.5 | 10.0 | 0 | <50 |
| C-16 | 9.0 | 10.0 | 0 | <50 |
| C-16 | 9.5 | 9.51 | 7.8 | N/A |
| C-18[a] | 9.5 | 8.1 | 18.0 | N/A |
| C-18[b] | 9.5 | 8.9 | 9.7 | N/A |

[a] Prepared by biochemical synthesis
[b] Prepared by chemical synthesis

Synthesis for the Samples in Table I.

The samples were prepared under identical conditions except for the differences in pH during the initial stages as noted in Table I, and the particular diacids, as noted in Table I.

Polymerizations were carried out under identical conditions at 10 mole % diacid levels, based on the dihydric phenol, for sebacic acid (C-10), dodecanedioc acid (C-12), hexadecanedioic acid (C-16) and octadecanedioc acid (C-18). The polymers were analyzed for diacid incorporation and the level of anhydride and acid compared to ester in the polymer structure.

The following experimental procedure was followed. A 500 milliliter Morton flask was charged with diacid (17.2 mmol), BPA (35.31 grams, 154.9 mmol), p-cumylphenol (1.64 grams, 7.7 mmol, 4.5 mole %), methylene chloride (150 ml), distilled water (80 nl) and triethylamine (TEA) (430 µl, 2.0 mole %). The reaction was treated with an aqueous solution of 50 wt % NaOH and stirred for 5 minutes. Phosgene (12.15 grams, 121.5 mmol, 70 mole % equivalence) was added at 0.6 grams/minute while maintaining the pH of the reaction mixture at the initial pH value (from 7.5 to 9.5, see Table I) by the addition of the aqueous solution of NaOH. Following addition of the phosgene, the pH was raised to 10.5 over a 3 minute period and phosgene (7.75 grams, 20.9 grams total, 20 mole % excess) was added at 0.6 grams/minute.

The solution containing the product was separated from the brine and was washed one time with 1 N HCl and four times with distilled water. The brine was acidified with concentrated HCl and the level of diacid present was determined by comparison of the precipitated diacid with standards. The solution containing the product was precipitated into boiling water (750 ml) in a blender, washed with water (500 ml) and dried overnight at 100° Celsius under vacuum. The polymer was analyzed to determine the level of diacid, as well as the ratio of ester groups to anhydride groups.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for preparing a polyestercarbonate, the method comprising reacting a dihydric phenol and a diacid having from about 16 to about 30 carbon atoms in the presence of an effective amount of carbonate precursor, thereby forming a reaction mixture, wherein the pH of the reaction mixture is maintained in an initial pH range of from about 8.5 to about 9.0 for about 50% to about 95% of the total carbonate precursor addition, and a second pH range of from about 10 to about 12 for the remainder of the carbonate precursor addition.

2. The method of claim 1, wherein the dihydric phenol is BPA.

3. A method for preparing a polyestercarbonate, the method comprising reacting a dihydric phenol and a diacid having from about 16 to about 18 carbon atoms in the presence of an effective amount of carbonate precursor, thereby forming a reaction mixture, wherein the pH of the reaction mixture is maintained in an initial pH range of from about 8.5 to about 9.0 for about 50 to about 95% of the total carbonate precursor addition, and a second pH range of from about 10 to about 12 for the remainder of the carbonate precursor addition.

4. The method of claim 3, wherein the dihydric phenol is BPA.

5. A method for preparing a polyestercarbonate, the method comprising reacting a dihydric phenol and a diacid having from 16 to 18 carbon atoms in the presence of an effective amount of carbonate precursor, thereby forming a reaction mixture, wherein the pH of the reaction mixture is maintained in an initial pH range of from about 8.5 to about 9.0 for about 50 to about 95% of the total carbonate precursor addition, and a second pH range from about 10 to about 12 for the remainder of the carbonate precursor addition.

6. A method for preparing a polyestercarbonate, the method comprising reacting a dihydric phenol and a diacid having 16 carbon atoms in the presence of an effective amount of carbonate precursor, thereby forming a reaction mixture, wherein the pH of the reaction mixture is maintained in an initial pH range of from about 9.0 to about 9.5 for about 50 to about 95% of the total carbonate precursor addition, and a second pH range of from about 10 to about 12 for the remainder of the carbonate precursor addition.

7. The method of claim 6, wherein the diacid is hexadecanedioic acid and the dihydric phenol is BPA.

8. A method for preparing a polyestercarbonate, the method comprising reacting BPA and hexadecanedioic acid in the presence of an effective amount of phosgene, thereby forming a reaction mixture, wherein the pH of the reaction mixture is maintained in an initial pH range of from about 8.5 to about 9.0 for about 50 to about 95% of the total carbonate precursor addition, and a second pH range of from about 10 to about 12 for the remainder of the phosgene addition.

9. A method for preparing a polyestercarbonate, the method comprising reacting a dihydric phenol and octadecanedioic acid in the presence of an effective amount of carbonate precursor, thereby forming a reaction mixture, wherein the pH of the reaction mixture is maintained in an initial pH range of from about 8.5 to about 9.0 for about 50% to about 95% of the total carbonate precursor addition, and a second pH range of from about 10 to about 12 for the remainder of the carbonate precursor addition.

10. A method for preparing a polyestercarbonate, the method comprising reacting BPA and octadecanedioic acid in the presence of an effective amount of phosgene, thereby forming a reaction mixture, wherein the pH of the reaction mixture is maintained in an initial pH range of from about 8.5 to about 9.0 for about 50 to about 95% of the total carbonate precursor addition, and a second pH range of from about 10 to about 12 for the remainder of the phosgene addition.

11. A polyestercarbonate prepared by the method of claim 1.

12. A polyestercarbonate prepared by the method of claim 3.

13. A polyestercarbonate prepared by the method of claim 5.

14. A polyestercarbonate prepared by the method of claim 6.

15. A polyestercarbonate prepared by the method of claim 8.

16. A polyestercarbonate prepared by the method of claim 9.

17. A polyestercarbonate prepared by the method of claim 10.

18. An article prepared from the polyestercarbonate of claim 1.

19. An article prepared from the polyestercarbonate of claim 3.

20. An article prepared from the polyestercarbonate of claim 5.

21. An article prepared from the polyestercarbonate of claim 6.

22. An article prepared from the polyestercarbonate of claim 8.

23. An article prepared from the polyestercarbonate of claim 9.

24. An article prepared from the polyestercarbonate of claim 10.

* * * * *